Aug. 30, 1938.  E. T. STRAND ET AL  2,128,718
MEASURED QUANTITY DISPENSER
Filed Oct. 28, 1937

Inventors
E. T. Strand
F. P. Colgan
By H. Davidson Yeo
Attorneys

Patented Aug. 30, 1938

2,128,718

UNITED STATES PATENT OFFICE 2,128,718

MEASURED QUANTITY DISPENSER

Edward T. Strand and Francis P. Colgan, Salem, Oreg.

Application October 28, 1937, Serial No. 171,588

1 Claim. (Cl. 221—114)

The invention aims to provide a new and improved device for dispensing measured quantities of liquid, and while the device is intended primarily for dispensing milk from a milk bottle, it is not restricted to such use.

With the above and minor objects in view, the invention resides in the novel subject matter hereinafter described and claimed, description being accomplished by reference to the accompanying drawing.

Figure 1:
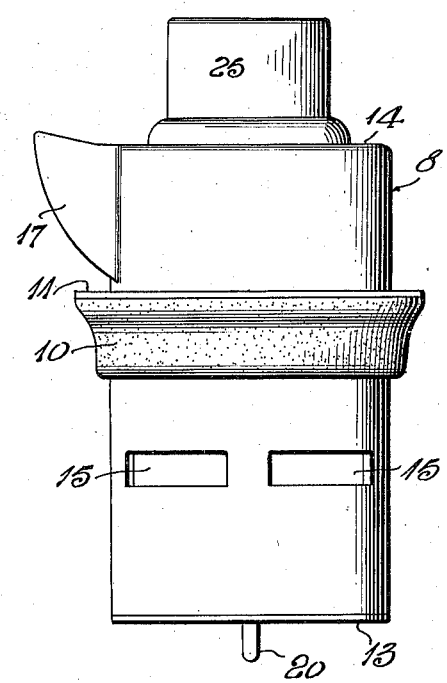
Fig. 1 is a side elevation of the device.
Figure 2:
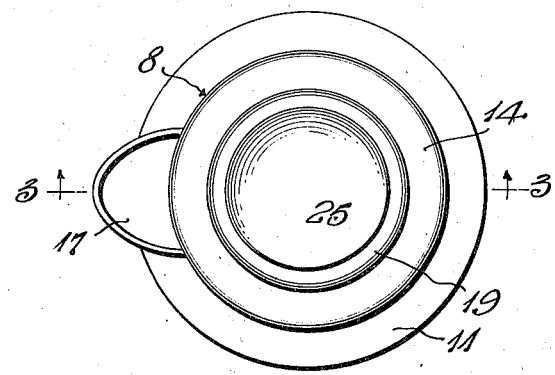
Fig. 2 is a top plan view.

In the drawing above briefly described, the numeral 8 denotes a casing for partial insertion into a milk bottle 9 or other container, said casing having a gasket 10 of rubber or the like, backed by a fixed flange 11, to wedge fluid-tightly into the container mouth. The casing 8 comprises a cylindrical side wall 12, a bottom 13 and a top 14. At points spaced above the bottom 13, the side wall 12 is provided with circumferentially spaced liquid inlet slots 15, and said side wall is provided near the top 14, with an outlet slot 16 which communicates with a suitable spout 17. The top 14 is formed with a central opening 18 of circular outline and is preferably provided with an upstanding flange 19 around said opening. The bottom 13 is preferably in the form of a screw plug having a suitable fingerpiece 20 by means of which it may be readily unthreaded, permitting removal of the valve and valve spring hereinafter described.

A valve 21 is slidably mounted in the casing 8, said valve having a cylindrical imperforate side wall 22 and a top 23, but being open at its lower end to receive liquid. The top 23 normally contacts with the lower side of the casing top 14 and is provided with circumferentially spaced liquid-conducting slots 24. This top 23 is also provided with an outwardly projecting operating button 25 which passes snugly but slidably through the opening 18. When the valve 21 is in the normal position shown in Fig. 3, its side wall 22 closes the outlet slot 16 and the lower end of said side wall is then above the liquid inlet slots 15.

Figure 3:
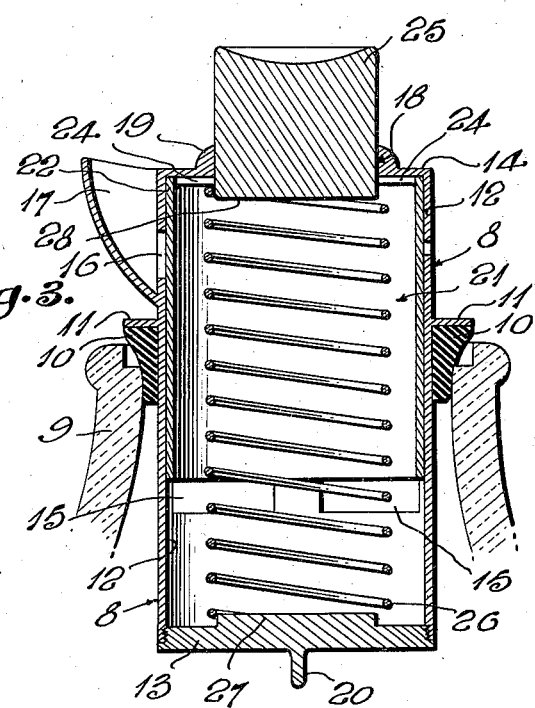
Fig. 3 is a vertical sectional view on line 3—3 of Fig. 2.
Figure 4:
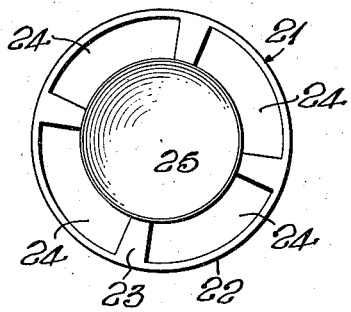
Fig. 4 is a top plan view of the slidable valve.

A coiled spring 26 normally holds the valve 21 in the position of Fig. 3, said spring bearing at one end against the casing bottom 13 and at its other end against the valve top 23, said bottom 13 and top 23 being preferably provided with bosses 27 and 28 respectively which are surrounded by said spring 26 to hold the latter centered.

When the container 9 and the attached device are totally or partially inverted, liquid from said container flows through the slots 15 and fills the valve 21. While the container and dispensing device are in this or similar position, the button 25 is forced inwardly, thus sliding the valve 21 so that its lower end closes the slots 15 and its upper end opens the slot 16. Liquid from the interior of the valve then flows through the slots 25 in the valve top, into the space between this top and the casing top 14, and this liquid discharges through the slot 16 and spout 17.

From the foregoing taken in connection with the accompanying drawing, it will be seen that a simple and inexpensive device has been provided for the desired purpose. The entire device may be readily disassembled for cleaning and sterilizing, as removal of the casing bottom 13 permits withdrawal of the spring 26 and the valve 21. The device may be reassembled with equal speed and ease.

While preferred details have been shown, variations may be made within the scope of the invention as claimed, both with respect to structure and use, and it will be obvious that any desired material or materials may be employed in the manufacture of the article.

We claim:—

A measured quantity dispenser comprising a casing having a continuous side wall, a bottom, and a top, said top being provided with a central opening, said side wall being provided with a liquid inlet in its lower portion and with a liquid outlet in its upper portion, external means between the ends of said casing for establishing a seal between said side wall and a container when the lower end portion of said casing is inserted into the container, a hollow valve slidable in said casing and having an open lower end, said valve having a continuous side wall and a top, said valve top being provided with a central operating button passing slidably through said central opening of said casing top, said valve top being provided also with an opening for conducting liquid from the interior of the valve to the space between said valve top and said casing top when the valve is slid inwardly, and a spring for normally holding said valve in a raised position in which its side wall closes said liquid outlet and is disposed above said liquid inlet, whereby when the device is inverted said valve may fill with liquid, said valve side wall serving to close said liquid inlet and open said liquid outlet when said valve is pushed inwardly with the device inverted, whereby the liquid from the valve may enter the space between the valve top and the casing top and discharge from said space through said liquid outlet.

EDWARD T. STRAND.
FRANCIS P. COLGAN.